US008386369B2

(12) United States Patent
Warnick

(10) Patent No.: US 8,386,369 B2
(45) Date of Patent: Feb. 26, 2013

(54) METHOD FOR RECEIVING BIDS ON AN ENERGY-SAVINGS AND ENERGY SUPPLY PORTFOLIO

(75) Inventor: Derek Warnick, Boston, MA (US)

(73) Assignee: World Energy Solutions, Inc., Worcester, MA (US)

( * ) Notice: Subject to any disclaimer, the term of this patent is extended or adjusted under 35 U.S.C. 154(b) by 63 days.

(21) Appl. No.: 12/917,872

(22) Filed: Nov. 2, 2010

(65) Prior Publication Data

US 2011/0106687 A1   May 5, 2011

Related U.S. Application Data

(60) Provisional application No. 61/257,569, filed on Nov. 3, 2009.

(51) Int. Cl.
*G06Q 40/00* (2012.01)
(52) U.S. Cl. ........ 705/37; 700/295; 705/7.25; 705/7.36; 705/7.37; 705/26.3; 705/36 R
(58) Field of Classification Search ........................ None
See application file for complete search history.

(56) References Cited

U.S. PATENT DOCUMENTS

| | | | | |
|---|---|---|---|---|
| 5,394,324 A | * | 2/1995 | Clearwater | 705/7.25 |
| 6,374,227 B1 | * | 4/2002 | Ye | 705/7.25 |
| 6,598,029 B1 | * | 7/2003 | Johnson et al. | 705/37 |
| 7,062,361 B1 | * | 6/2006 | Lane | 700/295 |
| 7,409,360 B1 | * | 8/2008 | Lark et al. | 705/26.3 |
| 7,451,449 B2 | | 11/2008 | Thompson | |
| 7,457,769 B2 | * | 11/2008 | Goren et al. | 705/26.3 |
| 7,590,593 B2 | | 9/2009 | Madoff et al. | |
| 7,599,866 B2 | | 10/2009 | Yan et al. | |
| 7,756,773 B2 | * | 7/2010 | Du Preez et al. | 705/37 |
| 7,783,529 B2 | | 8/2010 | Sandholm et al. | |
| 2002/0046155 A1 | * | 4/2002 | Mashinsky et al. | 705/37 |
| 2003/0023540 A2 | * | 1/2003 | Johnson et al. | 705/37 |
| 2003/0041002 A1 | * | 2/2003 | Hao et al. | 705/37 |
| 2003/0216971 A1 | * | 11/2003 | Sick et al. | 705/26 |
| 2003/0225661 A1 | * | 12/2003 | Peljto | 705/36 |
| 2004/0015433 A1 | * | 1/2004 | Johnson et al. | 705/37 |
| 2007/0299763 A1 | * | 12/2007 | Yoshida | 705/37 |
| 2010/0023376 A1 | * | 1/2010 | Brown | 705/10 |
| 2011/0004500 A1 | * | 1/2011 | Nathuji | 705/7 |

FOREIGN PATENT DOCUMENTS

WO    WO 01/43040    *   6/2001

OTHER PUBLICATIONS

Ross A. Gagliano et al., "Simulation of a Market Model for Distributed Control," Record of Proceedings, pp. 171-187, The 21st Annual Symposium Mar. 16-18, 1988, Tampa, Fla.*

* cited by examiner

*Primary Examiner* — Robert Niquette
(74) *Attorney, Agent, or Firm* — Brian M. Dingman; Mirick, O'Connell, DeMallie & Lougee, LLP

(57) ABSTRACT

A computer-implemented method for determining an optimal award schedule for satisfaction of energy efficiency and energy supply requirements for a portfolio of one or more buildings. A first auction is conducted so as to receive over a computer network, from one or more prospective efficiency suppliers, a plurality of first bids for the provision of energy efficiency, each such first bid specifying an amount of energy saved and a cost. A computer is used to determine a schedule of remaining portfolio energy supply requirements that would remain after the provision of energy efficiency from at least a plurality of the first bids. A second auction is then run so as to receive over the computer network, from one or more prospective energy suppliers, one or more second bids for a plurality of the remaining portfolio energy supply requirements, each such second bid specifying a cost. A computer is then used to determine the lowest cost combination of a first bid and a second bid that satisfies the portfolio energy requirement.

15 Claims, 1 Drawing Sheet

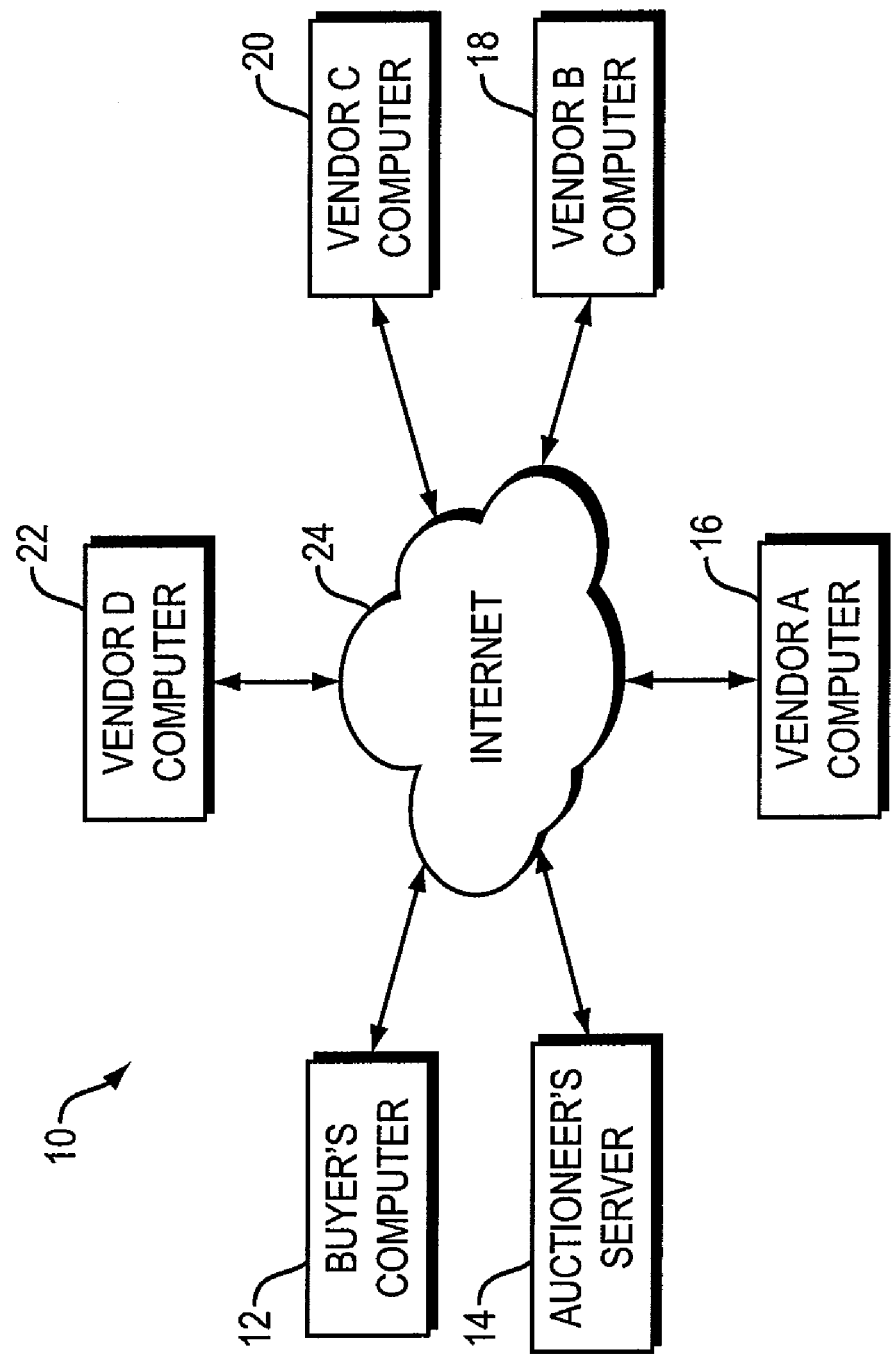

METHOD FOR RECEIVING BIDS ON AN ENERGY-SAVINGS AND ENERGY SUPPLY PORTFOLIO

CROSS-REFERENCE TO RELATED APPLICATION

This application claims priority of Provisional Patent Application Ser. No. 61/257,569 filed on Nov. 3, 2009.

FIELD

This disclosure relates to method for soliciting and receiving bids on energy efficiency and energy supply services to a buyer that holds one or more properties.

BACKGROUND

There are sound environmental and business reasons for providing energy efficiency measures to buildings. Although energy savings measures have a capital cost, they do save energy and the cost of the saved energy year over year. However, without knowing the cost to supply the energy needs after the provision of the energy savings measures, it is not possible to determine the most cost-effective energy savings measures to incorporate.

SUMMARY

This disclosure relates to a method for conducting bidding on the provision of energy efficiency services to a buyer that holds one or more properties. The process may also include conducting bidding on the provision of energy supply needs of the buyer that would remain after the energy efficiency measures are taken; this allows the buyer to choose a combination of energy savings measures and energy supply that meets its needs for the one or more buildings in the building portfolio under consideration.

Typically the buyer has a portfolio of buildings that are the subject of the bidding. The energy savings measures can comprise any one or more measures from suites of available energy savings measures such as heating and cooling system upgrades, insulation, weather-stripping and the like. The vendors bid on the cost of providing a defined number of energy savings units across the portfolio. The units may be avoided kilowatt hours (kWh). The energy savings measures can be but need not be bid in groups or blocks of units. In some cases more than one quantity of saved energy units is subject to bidding or is bid upon; this provides a number of possible outcomes that could be favorable to the buyer. A second bidding process can then be conducted for the provision of the energy needs of the portfolio that would remain after the provision of the energy savings quantities that have been bid. Lowest cost possible outcomes can be determined in advance of this second bidding process, to focus the bidding on achieving a lowest cost. Contracts can then be signed with the winners of both bids.

Featured in one embodiment is a computer-implemented method for determining an optimal award schedule for satisfaction of energy efficiency and energy supply requirements for a portfolio of one or more buildings, where the energy requirements of the portfolio are known, the method comprising receiving over a computer network, from one or more prospective efficiency suppliers, a plurality of first bids for the provision of energy efficiency, each such first bid specifying an amount of energy saved and a cost, determining by a computer a schedule of remaining portfolio energy supply requirements that would remain after the provision of energy efficiency from at least a plurality of the first bids, receiving over the computer network, from one or more prospective energy suppliers, one or more second bids for a plurality of the remaining portfolio energy supply requirements, each such second bid specifying a cost, and determining by a computer a combination of a first bid and a second bid that satisfies the portfolio energy requirement.

There may be a plurality of prospective efficiency suppliers that place first bids. The first bids may comprise a quantity of avoided kilowatt hours (kWh). The first bids may further comprise a cost per avoided kWh. Determining by a computer a combination of a first bid and a second bid that satisfies the portfolio energy requirement may comprise determining the costs of one or more combinations by calculating a first bid total cost plus a second bid total cost. Determining by a computer a combination of a first bid and a second bid that satisfies the portfolio energy requirement may further comprise determining the least expensive combination of a first bid and a second bid.

Receiving over a computer network, from one or more prospective efficiency suppliers, a plurality of first bids for the provision of energy efficiency may comprise conducting a first auction. Conducting a first auction may comprise soliciting bids of an amount of energy efficiency at a bid cost, wherein the amount of energy efficiency bid on is variable. Bidding on the variable amount of energy efficiency may be constrained to bidding in blocks of avoided energy usage. The costs may be bid per block of avoided energy usage. During the first auction the costs of bids may be made available to prospective bidders over the computer network but the amount of energy efficiency bid on in the first bids is not made available to prospective bidders over the computer network. The amount of energy efficiency may be divided into units comprising avoided kilowatt hours and the cost is bid on a per avoided kWh basis.

Determining by a computer a schedule of remaining portfolio energy supply requirements that would remain after the provision of energy efficiency from at least a plurality of the first bids may comprise determining by a computer one or more possible lowest total cost combinations of energy efficiency first bid costs plus the cost of remaining portfolio energy supply requirements at different energy supply unit costs. Receiving over the computer network, from one or more prospective energy suppliers, one or more second bids for a plurality of the remaining portfolio energy supply requirements may comprise conducting a second auction. Conducting a second auction may comprise soliciting bids for energy supply amounts equal to the remaining portfolio energy supply requirements for each of the one or more possible lowest total cost combinations of energy efficiency first bid costs plus the cost of remaining portfolio energy supply requirements at different energy supply unit costs.

Also featured is a computer-implemented method for determining an optimal award schedule for satisfaction of energy efficiency and energy supply requirements for a portfolio of one or more buildings, where the energy requirements of the portfolio are known, the method comprising conducting a first auction and during the first auction receiving over a computer network, from a plurality of prospective efficiency suppliers, a plurality of first bids for the provision of energy efficiency, wherein the amount of energy efficiency that can be bid on is variable, each such first bid specifying a quantity of avoided kilowatt hours (kWh) and a cost per avoided kWh, and wherein during the first auction the costs of bids are made available to prospective bidders over the computer network but the amount of energy efficiency bid on in the first bids is not made available to prospective bidders over the computer network, determining by a computer a schedule of remaining portfolio energy supply requirements that would remain after the provision of energy efficiency from at least a plurality of the first bids, wherein determining by a computer a schedule of remaining portfolio energy supply requirements that would remain after the provision of energy efficiency from at least a plurality of the first bids comprises determining by a computer one or more possible lowest total cost combinations of energy efficiency first bid costs plus the cost of remaining portfolio energy supply requirements at different energy supply unit costs, conducting a second auction to solicit bids for energy supply amounts equal to the remaining portfolio energy supply requirements for each of the one or more possible lowest total cost combinations of energy efficiency first bid costs plus the cost of remaining portfolio energy supply requirements at different energy supply unit costs, and during the second auction receiving over the computer network, from one or more prospective energy suppliers, one or more second bids for a plurality of the remaining portfolio energy supply requirements, each such second bid specifying a cost, and determining by a computer a lowest cost combination of a first bid and a second bid that satisfies the portfolio energy requirement.

Further featured is a computer-implemented method for screening bids in a supply auction of an energy-savings portfolio that is executed over a distributed networked computer system, comprising a) gathering from the buyer information relating to a portfolio of building properties, the information including square footage, building usage, location, energy usage and existing energy-efficiency measures;

b) combining the gathered information to create a profile for the portfolio;

c) using a computer to make the profile available to vendors' computers that are connected to the network;

d) conducting a supply auction by receiving over the network bids placed by vendors, the bids including the quantity of energy efficiency units, and the price per unit at which the energy efficiency will be delivered;

e) during the auction using a networked computer to make the price per unit of the bids, but not the quantity bid, available to vendors' computers that are connected to the network;

f) closing the auction; and g) after the auction has closed, determining one or more combinations of bid prices and quantities that may comprise viable winning bids.

BRIEF DESCRIPTION OF THE DRAWING

The drawing illustrates a system that can be used to accomplish the method for receiving bids on an energy-savings and energy supply portfolio.

DETAILED DESCRIPTION

The following describes the basic steps for accomplishing an energy savings embodiment of the method, and an embodiment in which an energy supply auction is conducted after the energy savings auction, to result in bids that, as combined, accomplish a low cost means for a property owner or manager to institute energy savings measures in the property portfolio while providing for energy supply needs remaining after the energy savings steps have been implemented.

In an embodiment, an auction (or two sequential auction events) is conducted through computers that are connected to a network such as the internet or another network, with three parties participating: the buyer, the bidders (vendors) and the auctioneer. In the drawing, system 10 comprises buyer's computer 12, auctioneer's server 14, and four vendor computers (computer 16 of Vendor A, computer 18 of Vendor B, computer 20 of Vendor C, and computer 22 of Vendor D) that can all communicate with one another over a secure or open network, in this case the internet 24. Typically, computers 12 and 14 communicate in both directions with each other. Typically computers 16, 18, 20 and 22 communicate in both directions with computer 22, but computers 16, 18, 20 and 22 do not communicate with one another. Also, typically computer 12 does not communicate with any of computers 16, 18, 20 and 22. The buyer engages the auctioneer to conduct the auction, and supplies the necessary information concerning the properties that are subject to the auction, but does not actively participate in the bidding. Instead, the auctioneer conducts the auction(s) via computer 14. The vendors are parties that review the profile of the subject matter to be bid upon (e.g., a portfolio offered for energy savings services and/or one or more potential energy supply contracts), some but not necessarily all of whom will actually bid to vend or supply energy savings services and/or energy supply (e.g., electricity, natural gas and/or heating oil). The parties bidding can be parties that actually deliver the products or services, or other parties in the supply chain such as distributors. There can be one or more bidders for each auction. The bidders for the different auctions can be discrete, or partially or fully overlapping. The results of the auctions are winning bids that are typically then made the subject of contracts between the parties, typically directly between the buyer and the winning vendor(s).

Energy Savings Auction:

Step 1. A portfolio of properties (buildings) is selected by the buyer.

Step 2. These buildings have their key attributes relating to energy usage determined (e.g., square footage, use [office, retail, etc,], location, energy usage), as well as what if any efficiency measures have been implemented.

Step 3. This information is combined and processed in order to create a profile for the entire portfolio in aggregate. Up to this point the steps are feeding into each other to determine all of the key information that is needed in order to access the relevant building attributes from the perspective of an energy efficiency supply company (the vendors that will be bidding). The profile information is loaded onto either the buyer's or the auctioneer's computer that is accessible to bidders over a computer network such as the internet.

Step 4. Potential bidders (vendors, or suppliers of the energy efficiency implementation services) access this portfolio of properties using their own computers connected to the network and determine how many avoided or saved-energy units (e.g., kWh) they can deliver, and at what price they would be able to deliver them. If desired, the buyer can break the total energy needs into blocks of energy savings on which suppliers are able to bid.

Step 5. Once the vendors understand this information they can participate in the auction conducted by the auctioneer.

Step 6. The auction is a dual point auction. Suppliers (vendors) will bid on the number of avoided kWhs they can deliver, as well as the price per avoided kWh. The auction can be conducted in blocks of energy units (e.g., 10,000 kWh per block) and the suppliers can bid on one or more blocks, or bidding can take place based on other energy savings units, such as avoided kWh.

Step 7. During the auction, the prices bid are exposed to all bidders over the network via the auctioneer's computer. However, the quantity terms of the bids are kept private. This helps to drive prices downward.

Step 8. Once the auction is complete, there can be a number of combinations of different prices and quantities that might be attractive to the buyer. There need not be a clear winner. The buyer can select one or more vendors with which to enter contracts according to the bids.

EXAMPLES

Energy Savings Auctions

Example 1

Electricity Savings 1) 100 buildings are chosen from portfolio owner X.
2) These buildings are of the type 'office', and range in square footage from 20,000-100,000 square feet, located in Florida, and consume on average 20 kWh per square foot per year. They have no efficiency measures in place.
3) The portfolio is determined to have 15 million square feet total, and an energy usage of 300 million kWh per year.
4) The minimum amount of energy savings on which a supplier can bid, termed a "block" is determined. In the example, a block is 10,000 kWh.
5) Suppliers determine what their pricing will be and if they think they can make money by averaging their assumed costs across this 15 million square feet.
6) Suppliers go through the process of signing up as suppliers for the auction and complete the required paperwork and credit checks.
7) Supplier 1 ends up bidding 20 million avoided kWh or 2,000 blocks of 10,000 kWh, at a cost of $1,000 per block. Supplier 2 bids 3,000 blocks at a cost of $1,500 per block. Supplier 3 bids $4,000 blocks at a cost of $1,600 per block. This result is possible because the suppliers are applying a weighted cost average of expenses and returns across the portfolio in question.
8) The auction process shows the bidders that the lowest price bid was $1,000. They do not know what the highest quantity of bid units has been.

This process incentivizes suppliers to lower their prices and raise their quantities, without necessarily picking a clear winner with the process.

Example 2

Natural Gas Savings 1) 100 buildings are chosen from portfolio owner X.
2) These buildings are of the type, 'office', and range in square footage from 20,000-100,000 square feet, located in Florida, and consume on average 68,240 BTUs of Natural Gas energy per square foot per year. They have had no efficiency measures in place.
3) The portfolio is determined to have 15 million square feet total, and an energy usage of 1.2M dekatherms (dth) of natural gas per year.
4) The minimum amount of energy savings on which a supplier can bid, termed a "block" is determined. In the example, a block is 33.75 dth.
5) Suppliers determine what their pricing will be and if they think they can make money by averaging their assumed costs across the 15 million square feet.
6) Suppliers go through the process of signing up as suppliers for the auction and complete the required paperwork and credit checks.
7) Supplier 1 ends up bidding 2,000 blocks which is equal to 67,500 dth (kWh are directly convertible to BTUS through a standard formula of 3,412 BTUs=1 kWh) at a cost of $1,000 per block. Supplier 2 bids 3,000 blocks at a cost of $1,500 per block, and supplier 3 bids 4,000 blocks at a cost of $1,600 per block.
8) The auction process shows the bidders that the lowest price bid was $1,000, but they do not know what the highest amount of bid units was.

Also included is a method of conducting an auction (or, more typically, multiple auctions) on the provision of the portfolio energy needs that would remain after the various bid energy savings amounts have been installed in the building portfolio. In an embodiment the two types of auctions (energy savings and then energy supply) are conducted sequentially so as to determine a combination of a bid from the first auction (the energy savings auction) and the second auction(s) (the energy provision auction(s)) that when combined achieve the lowest cost result, or perhaps a result with at least a desired amount of energy savings that in combination has a low cost.

In an embodiment, the auctions are conducted through computers that are connected to a network such as the internet or another secure network, with three parties participating: the buyer, the bidders (vendors) and the auctioneer, as shown in the drawing. The buyer engages the auctioneer to conduct the auctions, and supplies the necessary information concerning the properties that are subject to the auctions, but does not actively participate in the bidding.

Example

Sequential Energy Savings and Energy Supply Auctions

1) Commercial Property Owner, ABC Properties, owns 96 buildings which, as a portfolio, ABC Properties would like to evaluate and price energy efficiency measures as well as energy to meet supply needs.
2) These buildings are of the type 'office', and range in square footage from 62,000-1,230,300 sqft, located in New York City. They currently have no significant energy efficiency measures in place.
3) The portfolio is determined to have total area of 21,148,800 sqft. The total energy consumption is 477,962,880 kWh annually, for an average energy consumption of 22.6 kWh per sqft per year.
4) Energy Efficiency RFP and auction architecture is determined to structure a dual-point, price and quantity auction to allow energy efficiency suppliers to bid on the amount of avoided kWh and price per avoided kWh to be offered to the buyer based on the portfolio.
5) Energy Supply RFP and auction architecture is determined to structure a price-based auction with energy supply quantity or quantities as of yet unknown. This auction will be run based on the results of the efficiency auction, because the amount of energy that needs to be purchased is predicated on the amount of avoided energy from efficiency measures.
6) Efficiency suppliers and energy suppliers who are not currently signed up on the auction platform go through the process of signing up as suppliers for the auction and complete the required paperwork and credit checks. This can be done using the suppliers' and the auctioneer's computers communicating over the network. Standard web browsers can be used to accomplish the interfacing and communication.

7) The energy efficiency auction is conducted first. Suppliers bid on amounts of kilowatt hours of energy efficiency they are able to provide, and the cost to provide such services. In this example, four suppliers bid on the energy efficiency; many are invited, but in this case four respond and bid. Efficiency-Supplier A bids 17 M avoided kWh at a cost of $0.0025 per avoided kWh ($42,500 total). Efficiency-Supplier B bids 21 M avoided kWh at a cost of $0.015 per avoided kWh ($315,000 total). Efficiency-Supplier C bids 23 M avoided kWh at a cost of $0.028 per avoided kWh ($644,000 total). Efficiency-Supplier D bids 25 M avoided kWh at a cost of $0.033 per avoided kWh ($825,000 total). See Table 1 for the results. These results are possible because the suppliers are applying a weighted cost average of expenses and returns across the portfolio in question and reach different conclusions about how much efficiency, and at what price, they can deliver.

8) The auction software and analysis software typically resides on an auctioneer server that is accessed via the internet. The software is used to model the possible outcomes of these results and determines that there are three possible winners (i.e., lowest bidders) of the four bidders. See Table 2 for a spreadsheet of results from the model, in which the potential winning (i.e., lowest) bids are bolded. As can be seen, Efficiency-Supplier A, who bid $0.0025 per avoided kWh at a quantity of 17 M avoided kWh has a winning bid if the price on the energy procurement auction (to follow) ends up being between $0.0001 per kWh and $0.0675 per kWh, with a total usage of 460,962,880 kWh (old usage of 477,962,880 minus the avoided kWhs bid of 17M). Efficiency-Supplier B, who bid $0.015 per avoided kWh at a quantity of 21 M avoided kWh, has a winning bid if the energy price on the energy procurement ends up being between $0.0676 per kWh and $0.1275 per kWh, with a total usage of 456,962,880 kWh (old usage of 477,962,880 minus the avoided kWhs bid of 21 M). Efficiency-Supplier C, who bid $0.028 per avoided kWh at a quantity of 23 M avoided kWh, does not have a winning bid under any conditions of the energy procurement, with a total usage of 454,962,880 kWh (old usage of 477,962,880 minus the avoided kWhs bid of 23 M). Efficiency-Supplier D, who bid $0.033 per avoided kWh at a quantity of 25 M avoided kWh, has a winning bid if the energy price on the energy procurement ends up being $0.1276 per kWh or more per kWh, with a total usage of 452,962,880 kWh (old usage of 477,962,880 minus the avoided kWhs bid of 25 M).

9) At this point, it is not possible to determine which energy efficiency bid will result in the lowest total cost to the buyer because the cost of the supply of the remaining energy needs of the portfolio are unknown. Therefore energy auctions are run for the supply of the amounts of remaining energy based on the determination of possible winning scenarios from the Energy Efficiency auction. In this case there are three possible lowest price combinations, and so three energy supply auctions are run, one for each remaining energy supply amount for each of the three energy efficiency amounts.

10) These three energy auctions are run for energy suppliers to compete to offer the lowest price based on usages of 460,962,880 kWh, 456,962,880 kWh, and 452,962,880 kWh. The results for the first auction of 460,962,880 kWh is $0.09678 per kWh bid by Energy-Supplier C, the results for the second auction of 456,962,880 kWh is $0.09702 per kWh bid by Energy-Supplier F, the results for the third auction of 452,962,880 kWh is $0.0975 per kWh bid by Energy-Supplier A.

11) The analysis software compares the results from the one dual-point energy efficiency auction with the three results from the energy supply auctions to determine the combination of bids that results in the lowest total cost, which is Efficiency-Supplier 2 for the energy efficiency contract at total price of $315,000 for 21 M avoided kWh. This leaves 456,962,880 kWh to be supplied; the winner from the energy auction is Energy-Supplier F, at total price of $44,334,539 for 456,962,880 kWh.

12) The winning pair is now determined: Efficiency-Supplier 2 and Energy-Supplier F, at a total cost of $44,649,539. Contracts can then be entered with these two bidders.

TABLE 1

| Efficiency Supplier | quantity bid (avoided kWh) | price bid (per avoided kWh) | Total price for efficiency |
|---|---|---|---|
| A | 17,000,000 | $0.0025 | $42,500 |
| B | 21,000,000 | $0.0150 | $315,000 |
| C | 23,000,000 | $0.0280 | $644,000 |
| D | 25,000,000 | $0.0330 | $825,000 |

TABLE 2

| price per kWh | Supply needed kWh 460,962,880 Energy cost | Supply needed kWh 456,962,880 Energy cost | Supply needed kWh 454,962,880 Energy cost | Supply needed kWh 452,962,880 Energy cost |
|---|---|---|---|---|
| $0.0100 | $4,652,129 | $4,884,629 | $5,193,629 | $5,354,629 |
| $0.0125 | $5,804,536 | $6,027,036 | $6,331,036 | $6,487,036 |
| $0.0150 | $6,956,943 | $7,169,443 | $7,468,443 | $7,619,443 |
| $0.0175 | $8,109,350 | $8,311,850 | $8,605,850 | $8,751,850 |
| $0.0200 | $9,261,758 | $9,454,258 | $9,743,258 | $9,884,258 |
| $0.0225 | $10,414,165 | $10,596,665 | $10,880,665 | $11,016,665 |
| $0.0250 | $11,566,572 | $11,739,072 | $12,018,072 | $12,149,072 |
| $0.0275 | $12,718,979 | $12,881,479 | $13,155,479 | $13,281,479 |
| $0.0300 | $13,871,386 | $14,023,886 | $14,292,886 | $14,413,886 |
| $0.0325 | $15,023,794 | $15,166,294 | $15,430,294 | $15,546,294 |
| $0.0350 | $16,176,201 | $16,308,701 | $16,567,701 | $16,678,701 |
| $0.0375 | $17,328,608 | $17,451,108 | $17,705,108 | $17,811,108 |
| $0.0400 | $18,481,015 | $18,593,515 | $18,842,515 | $18,943,515 |
| $0.0425 | $19,633,422 | $19,735,922 | $19,979,922 | $20,075,922 |
| $0.0450 | $20,785,830 | $20,878,330 | $21,117,330 | $21,208,330 |
| $0.0475 | $21,938,237 | $22,020,737 | $22,254,737 | $22,340,737 |
| $0.0500 | $23,090,644 | $23,163,144 | $23,392,144 | $23,473,144 |
| $0.0525 | $24,243,051 | $24,305,551 | $24,529,551 | $24,605,551 |
| $0.0550 | $25,395,458 | $25,447,958 | $25,666,958 | $25,737,958 |
| $0.0575 | $26,547,866 | $26,590,366 | $26,804,366 | $26,870,366 |
| $0.0600 | $27,700,273 | $27,732,773 | $27,941,773 | $28,002,773 |
| $0.0625 | $28,852,680 | $28,875,180 | $29,079,180 | $29,135,180 |
| $0.0650 | $30,005,087 | $30,017,587 | $30,216,587 | $30,267,587 |
| $0.0675 | $31,157,494 | $31,159,994 | $31,353,994 | $31,399,994 |
| $0.0700 | $32,309,902 | $32,302,402 | $32,491,402 | $32,532,402 |
| $0.0725 | $33,462,309 | $33,444,809 | $33,628,809 | $33,664,809 |
| $0.0750 | $34,614,716 | $34,587,216 | $34,766,216 | $34,797,216 |
| $0.0775 | $35,767,123 | $35,729,623 | $35,903,623 | $35,929,623 |
| $0.0800 | $36,919,530 | $36,872,030 | $37,041,030 | $37,062,030 |
| $0.0825 | $38,071,938 | $38,014,438 | $38,178,438 | $38,194,438 |
| $0.0850 | $39,224,345 | $39,156,845 | $39,315,845 | $39,326,845 |
| $0.0875 | $40,376,752 | $40,299,252 | $40,453,252 | $40,459,252 |
| $0.0900 | $41,529,159 | $41,441,659 | $41,590,659 | $41,591,659 |
| $0.0925 | $42,681,566 | $42,584,066 | $42,728,066 | $42,724,066 |
| $0.0950 | $43,833,974 | $43,726,474 | $43,865,474 | $43,856,474 |
| $0.0975 | $44,986,381 | $44,868,881 | $45,002,881 | $44,988,881 |
| $0.1000 | $46,138,788 | $46,011,288 | $46,140,288 | $46,121,288 |
| $0.1025 | $47,291,195 | $47,153,695 | $47,277,695 | $47,253,695 |
| $0.1050 | $48,443,602 | $48,296,102 | $48,415,102 | $48,386,102 |
| $0.1075 | $49,596,010 | $49,438,510 | $49,552,510 | $49,518,510 |
| $0.1100 | $50,748,417 | $50,580,917 | $50,689,917 | $50,650,917 |
| $0.1125 | $51,900,824 | $51,723,324 | $51,827,324 | $51,783,324 |
| $0.1150 | $53,053,231 | $52,865,731 | $52,964,731 | $52,915,731 |
| $0.1175 | $54,205,638 | $54,008,138 | $54,102,138 | $54,048,138 |
| $0.1200 | $55,358,046 | $55,150,546 | $55,239,546 | $55,180,546 |
| $0.1225 | $56,510,453 | $56,292,953 | $56,376,953 | $56,312,953 |
| $0.1250 | $57,662,860 | $57,435,360 | $57,514,360 | $57,445,360 |
| $0.1275 | $58,815,267 | $58,577,767 | $58,651,767 | $58,577,767 |
| $0.1300 | $59,967,674 | $59,720,174 | $59,789,174 | $59,710,174 |
| $0.1325 | $61,120,082 | $60,862,582 | $60,926,582 | $60,842,582 |
| $0.1350 | $62,272,489 | $62,004,989 | $62,063,989 | $61,974,989 |
| $0.1375 | $63,424,896 | $63,147,396 | $63,201,396 | $63,107,396 |

TABLE 2-continued

| price per kWh | Supply needed kWh 460,962,880 Energy cost | Supply needed kWh 456,962,880 Energy cost | Supply needed kWh 454,962,880 Energy cost | Supply needed kWh 452,962,880 Energy cost |
|---|---|---|---|---|
| $0.1400 | $64,577,303 | $64,289,803 | $64,338,803 | $64,239,803 |
| $0.1425 | $65,729,710 | $65,432,210 | $65,476,210 | $65,372,210 |
| $0.1450 | $66,882,118 | $66,574,618 | $66,613,618 | $66,504,618 |
| $0.1475 | $68,034,525 | $67,717,025 | $67,751,025 | $67,637,025 |
| $0.1500 | $69,186,932 | $68,859,432 | $68,888,432 | $68,769,432 |
| $0.1525 | $70,339,339 | $70,001,839 | $70,025,839 | $69,901,839 |
| $0.1550 | $71,491,746 | $71,144,246 | $71,163,246 | $71,034,246 |
| $0.1575 | $72,644,154 | $72,286,654 | $72,300,654 | $72,166,654 |
| $0.1600 | $73,796,561 | $73,429,061 | $73,438,061 | $73,299,061 |
| $0.1625 | $74,948,968 | $74,571,468 | $74,575,468 | $74,431,468 |
| $0.1650 | $76,101,375 | $75,713,875 | $75,712,875 | $75,563,875 |
| $0.1675 | $77,253,782 | $76,856,282 | $76,850,282 | $76,696,282 |
| $0.1700 | $78,406,190 | $77,998,690 | $77,987,690 | $77,828,690 |
| $0.1725 | $79,558,597 | $79,141,097 | $79,125,097 | $78,961,097 |
| $0.1750 | $80,711,004 | $80,283,504 | $80,262,504 | $80,093,504 |

What is claimed is:

1. A computer-implemented method for determining an optimal award schedule for satisfaction of energy efficiency and energy supply requirements for a portfolio of one or more buildings, where the energy requirements of the portfolio are known, the method comprising:
   a) receiving over a computer network, from one or more prospective efficiency suppliers, a plurality of first bids for the provision of energy efficiency measures that save energy use in the portfolio of buildings, each such first bid specifying an amount of energy saved and a cost for providing the energy efficiency measures;
   b) determining by a computer a schedule of energy supply requirements in the form of one or more of electricity, oil and natural gas for the building portfolio that would remain after the provision of the energy efficiency measures from at least a plurality of the first bids;
   c) receiving over the computer network, from one or more prospective suppliers of energy in the form of one or more of electricity, oil and natural gas, one or more second bids for a some or all of the remaining building portfolio energy supply requirements based on at least some of the first bids, each such second bid specifying a cost for providing the bid amount of energy in the form of one or more of electricity, oil and natural gas; and
   d) determining by a computer a combination of a first bid and a second bid that together satisfies the portfolio energy requirement.

2. The method of claim 1 wherein there are a plurality of prospective efficiency suppliers that place first bids.

3. The method of claim 2 wherein the first bids comprise a quantity of avoided kilowatt hours (kWh).

4. The method of claim 3 wherein the first bids further comprise a cost per avoided kWh.

5. The method of claim 1 wherein determining by a computer a combination of a first bid and a second bid that satisfies the portfolio energy requirement comprises determining the costs of one or more combinations by calculating a first bid total cost plus a second bid total cost.

6. The method of claim 5 wherein determining by a computer a combination of a first bid and a second bid that satisfies the portfolio energy requirement further comprises determining the least expensive combination of a first bid and a second bid.

7. The method of claim 1 wherein receiving over a computer network, from one or more prospective efficiency suppliers, a plurality of first bids for the provision of energy efficiency measures comprises conducting a first auction.

8. The method of claim 7 wherein conducting a first auction comprises soliciting bids of an amount of energy efficiency accomplished by the energy efficiency measures at a bid cost, wherein the amount of energy efficiency bid on is variable.

9. The method of claim 8 wherein bidding on the variable amount of energy efficiency is constrained to bidding in blocks of avoided energy usage.

10. The method of claim 9 wherein the costs are bid per block of avoided energy usage.

11. The method of claim 8 wherein during the first auction the costs of bids are made available to all prospective bidders over the computer network, but the amount of energy efficiency measures bid on in the first bids is not made available to prospective bidders over the computer network.

12. The method of claim 8 wherein the amount of energy efficiency being bid on in the first auction is divided into units comprising avoided kilowatt hours, and the cost is bid on a per avoided kWh basis.

13. The method of claim 1 wherein determining by a computer a schedule of energy supply requirements in the form of one or more of electricity, oil and natural gas for the building portfolio that would remain after the provision of the energy efficiency measures from at least a plurality of the first bids comprises determining by a computer one or more possible lowest total cost combinations of energy efficiency measures first bid costs, plus the cost of remaining portfolio energy supply requirements at a plurality of different energy supply unit costs.

14. The method of claim 13 wherein receiving over the computer network, from one or more prospective suppliers of energy in the form of one or more of electricity, oil and natural gas, one or more second bids for a some or all of the remaining building portfolio energy supply requirements based on at least some of the first bids, comprises conducting a second auction.

15. The method of claim 14 wherein conducting a second auction comprises soliciting bids for energy supply amounts equal to the remaining building portfolio energy supply requirements for each of the one or more possible lowest total cost combinations of energy efficiency measures first bid costs plus the cost of remaining portfolio energy supply requirements at a plurality of different energy supply unit costs.

* * * * *